(12) United States Patent  (10) Patent No.: US 7,519,390 B2
Malone et al.  (45) Date of Patent: Apr. 14, 2009

(54) TRANSMITTER AND RECEIVER ARCHITECTURE FOR MULTI-MODE WIRELESS DEVICE

(75) Inventors: Lawrence Jarrett Malone, Carlsbad, CA (US); Lon Christensen, San Diego, CA (US)

(73) Assignee: Spreadtrum Communications Inc., Grand Cayman (KY)

( * ) Notice: Subject to any disclaimer, the term of this patent is extended or adjusted under 35 U.S.C. 154(b) by 387 days.

(21) Appl. No.: 11/077,698

(22) Filed: Mar. 10, 2005

(65) Prior Publication Data

US 2006/0084469 A1  Apr. 20, 2006

Related U.S. Application Data

(60) Provisional application No. 60/551,344, filed on Mar. 10, 2004.

(51) Int. Cl.
*H04M 1/00* (2006.01)
(52) U.S. Cl. .................. 455/552.1; 455/78; 455/88; 455/553.1
(58) Field of Classification Search ............. 455/553.1, 455/557, 12.1, 552.1, 343.1, 78, 86, 266, 455/88, 550.1, 452.1, 77, 75, 74, 84, 87, 455/418, 500; 370/345, 342, 341, 299, 338
See application file for complete search history.

(56) References Cited

U.S. PATENT DOCUMENTS

| 5,537,415 | A | | 7/1996 | Miller et al. |
| 5,881,369 | A | * | 3/1999 | Dean et al. ............... 455/78 |
| 5,884,188 | A | | 3/1999 | Hayes, Jr. et al. |
| 5,943,333 | A | * | 8/1999 | Whinnett et al. ......... 455/553.1 |
| 6,029,052 | A | | 2/2000 | Isberg et al. |
| 6,169,733 | B1 | * | 1/2001 | Lee ........................ 455/552.1 |
| 6,405,025 | B1 | * | 6/2002 | Keski-Mattinen ........ 455/343.1 |
| 6,697,415 | B1 | * | 2/2004 | Mahany ..................... 455/88 |
| 2003/0193923 | A1 | | 10/2003 | Abdelgany et al. |

FOREIGN PATENT DOCUMENTS

| EP | 0534255 A2 | 3/1993 |
| EP | 1006668 A1 | 6/2000 |
| EP | 1089578 A2 | 4/2001 |
| EP | 1162754 A2 | 12/2001 |
| WO | WO02/27953 A1 | 4/2002 |

* cited by examiner

*Primary Examiner*—John J Lee (57) ABSTRACT

A multi-mode wireless device having a transceiver including a multi-mode transmitter and a multi-mode receiver. The transmitter can include a multi-mode transmit baseband portion configured to support all of the transmit modes. Similarly, the receiver can include a multi-mode baseband portion that is configured to support all of the receive modes. The transmitter can also include a frequency conversion stage that can convert the output from the transmit baseband portion to the desired transmit frequency. Multiple power amplifiers in parallel, each configured to support one or more of the operating modes, can selectively amplify the transmit signals. The receiver can include multiple low noise amplifiers (LNAs) in parallel, each configured to selectively amplify the received signals of one or more of the operating modes. The output of the LNAs can be coupled to a frequency conversion stage that downconverts the received signals and provides them to the baseband portion.

28 Claims, 6 Drawing Sheets

TRANSMITTER AND RECEIVER ARCHITECTURE FOR MULTI-MODE WIRELESS DEVICE

CROSS-REFERENCES TO RELATED APPLICATIONS

This application claims the benefit of U.S. Provisional Application No. 60/551,344, filed Mar. 10, 2004, entitled "TRANSMITTER AND RECEIVER ARCHITECTURE FOR MULTI-MODE WIRELESS SYSTEMS" hereby incorporated herein by reference in its entirety.

BACKGROUND OF THE INVENTION

Conventional practice is to design a radio transceiver targeted to a particular standard. For example, a radio transceiver to be used in a device that operates using the Bluetooth™ communication protocol is typically sized and customized to the Bluetooth protocol, while a transceiver configured to operate in accordance with a wireless telephone communication standard is sized and customized for operation with the communication standard. Generally the same can be said for radio transceivers designed for use in devices that operate using the IEEE 802.11 communication protocol.

Historically, a user that is interested in communicating in particular systems operates a distinct device dedicated to each of the communication protocols. The user is required to have multiple devices, with each device limited to communicating over a particular communication system using a particular communication protocol.

However, there is a trend in many applications that a communication device operates multiple communication protocol technologies, or operates multiple instances of the same communication protocol technology. Communication devices are continually shrinking in physical size and simultaneously increasing the ability to communicate over multiple communication systems each having a corresponding communication protocol. A multi-mode communication device can be configured to support communications over a Wireless Local Area Network (WLAN) as well as communications over a wide area network, such as a wireless telephone network. For example, a multi-mode communication device such as a cellular telephone device may include IEEE 802.11 WLAN and Bluetooth functionality along with GSM functionality.

The term WLAN typically refers to a class of wireless communication technology that operates at a distance up to 100 meters, and WPAN is commonly used to refer to a class of wireless communication technology that operates up to a distance of 10 meters. For simplicity, when used herein, the term WLAN is meant to encompass at least systems operating in accordance with standards such as IEEE 802.11/DS, 802.11a, 802.11b, and 802.11g. The term WLAN should not be limited to these technologies as any other shorter-range wireless communication technology, particularly, but not limited to, those that do not require a license for operation by the Federal Communications Commission (FCC) in the United States (U.S.) and other similar unlicensed bands outside of the U.S.

Wireless telephone networks can operate according to a variety of communication standards and corresponding communication protocols. Wireless telephone systems include, but are not limited to, those systems operating in accordance with GSM, GPRS, EDGE, AMPS, CDMA and WCDMA standards.

The desire to increase the inter-operability of a wireless device with multiple distinct communication systems complicates the efforts to shrink the physical size of the device. The multiple communication systems that are supported by a multi-mode wireless communication device are typically assigned to different frequency bands and can have different operating bandwidths and communication protocols. The desire to support multiple wireless communication systems in a single multi-mode device requires the device include the elements configured to support the communication system. However, the addition of elements to a device is contrary to the desire to minimize the physical size of the device. It is desirable to provide a multi-mode wireless device that supports multiple communication standards, but allows for a minimal physical size.

BRIEF SUMMARY OF THE INVENTION

A multi-mode wireless device having a transceiver including a multi-mode transmitter and a multi-mode receiver is disclosed. The transmitter can include a multi-mode transmit baseband portion configured to support all of the transmit modes. Similarly, the receiver can include a multi-mode baseband portion that is configured to support all of the receive modes. The transmitter can also include a frequency conversion stage that can convert the output from the transmit baseband portion to the desired transmit frequency. Multiple power amplifiers in parallel, each configured to support one or more of the operating modes, can selectively amplify the transmit signals. The receiver can include multiple low noise amplifiers (LNAs) in parallel, each configured to selectively amplify the received signals of one or more of the operating modes. The output of the LNAs can be coupled to a frequency conversion stage that downconverts the received signals and provides them to the baseband portion.

The frequency conversion stages in the transmitter and receiver can use a shared Local Oscillator (LO) to provide a reference signal for converting the signal to or from the multiple operating bands. The frequency of the LO can be programmed to correspond to the operating mode of the multi-mode wireless device. A shared digital baseband section can be coupled to the transmitter and receiver to perform the baseband processing necessary to support all of the operating modes.

The multi-mode wireless device can be configured to concurrently support the multiple communication standards in a time slice manner, where the modes of the transmitter and receiver are time multiplexed over the supported communication standards. The time multiplex sequence can be predetermined or can be determined based on active operating modes of the multi-mode wireless device.

A multi-mode wireless communication device capable of concurrent wireless communications with a plurality of wireless communication systems is disclosed herein. The device includes a multi-mode transceiver having a single transmit signal path and a single receive signal path, and a multi-mode baseband portion configured to configure an operating mode of the multi-mode transceiver in a time multiplex manner to each of the plurality of wireless communication systems to permit the concurrent wireless communications with the plurality of wireless communication systems.

Another embodiment of the multi-mode wireless communication device capable of concurrent wireless communications with a plurality of wireless communication systems includes a multi-mode transceiver integrated circuit including a transmitter having a plurality of power amplifiers in parallel, each power amplifier configured to amplify signals in at least one distinct transmit band of one of the plurality of wireless communication systems, and a receiver having a plurality of Low Noise Amplifiers (LNAs) in parallel, each LNA configured to amplify signals in at least one distinct receive band of the plurality of wireless communication systems, and a multi-mode baseband portion configured to configure an operating mode of the multi-mode transceiver in a time multiplex manner to each of the plurality of wireless communication systems to permit the concurrent wireless communications with the plurality of wireless communication systems.

A method of configuring a multi-mode wireless communication device is also disclosed. The method includes selecting a communication system from a plurality of supported wireless communication systems, determining an operating mode for the selected wireless communication system, configuring a multi-mode transceiver based in part on the operating mode, and operating in the operating mode for a predetermined period of time.

Another embodiment of a method of configuring a multi-mode wireless communication device includes time multiplexing an operating mode of a multi-mode wireless transceiver. Time multiplexing the operating mode includes configuring the multi-mode wireless transceiver for one of a plurality of operating modes, selectively deactivating at least one Low Noise Amplifier (LNA) from a plurality of LNAs in parallel within the multi-mode wireless transceiver, each LNA configured to amplify signals in at least one distinct receive band of a plurality of wireless communication systems, and selectively deactivating at least one of a plurality of power amplifiers in parallel within the multi-mode wireless transceiver, each power amplifier configured to amplify signals in at least one distinct transmit band of the plurality of wireless communication systems.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

A multi-mode wireless device includes a multi-mode antenna, transmitter, receiver and corresponding baseband portions. Each of the elements in the multi-mode wireless device can used resources that are shared for multiple operating modes. The use of shared resources allows the device elements to be more efficiently designed and reduces the packaging requirements for supporting multiple modes.

The receiver can include multiple LNAs coupled in parallel, with each LNA supporting the operating band of one or more wireless communication standards. Typically, a single LNA does not have sufficient performance to support signals in all of the operating bands corresponding to the supported communication standards. Each of the LNAs can be configured to selectively amplify the received signal, based on the operating mode of the multi-mode wireless device.

The output of the LNAs can be coupled to a frequency conversion stage, where the received signals can be downconverted to baseband or a low Intermediate Frequency (IF). In one embodiment, the frequency conversion stage can include a mixer that is configured to operate over all of the operating bands of the supported communication standards. The frequency conversion stage can receive a LO signal from a common LO that is shared with the transmitter.

The output of the frequency conversion stage can be coupled to an analog baseband portion that can be configured to filter and amplify the received signal according to any one of the multiple communication standards. The analog baseband portion can also be configured to perform analog to digital conversion to convert the signal into a digital representation for further processing. The output of the Analog to Digital Converter (ADC) can be the output of the receiver.

The output of the receiver can be coupled to a digital baseband portion. The digital baseband portion can include one or more baseband processors on one or more integrated circuits and can be configured to interface with each of the communication systems supported by the wireless device.

The digital baseband can also be configured to support the transmit signal path for the multi-mode device. The digital baseband can be configured to generate the digital transmit baseband signal that is coupled to an analog transmit baseband portion. The analog transmit baseband portion can be configured to convert the digital baseband signal to an analog representation and filter and scale the analog baseband signal appropriately, based on the operating mode of the transmitter.

The output of the analog baseband portion can be coupled to a frequency upconversion stage that is configured to convert the baseband transmit signal to the appropriate operating frequency. The frequency upconversion stage can use the same LO that is used by the frequency conversion stage in the receiver. The LO can be programmed to tune to the desired LO frequency for upconversion when the multi-mode device is configured to transmit in one of the supported communication systems.

The output of the frequency upconversion stage can be coupled to a plurality of power amplifiers configured in parallel. Each of the power amplifiers can be configured to support one or more of the operating bands corresponding to one or more of the communication systems supported by the multi-mode device. The output of the power amplifiers can be coupled to the antenna. In one embodiment, the analog transmit baseband portion and the frequency upconversion stage can be implemented on a single integrated circuit, and the plurality of power amplifiers may each be discrete power amplifiers external to the integrated circuit.

Figure 1:
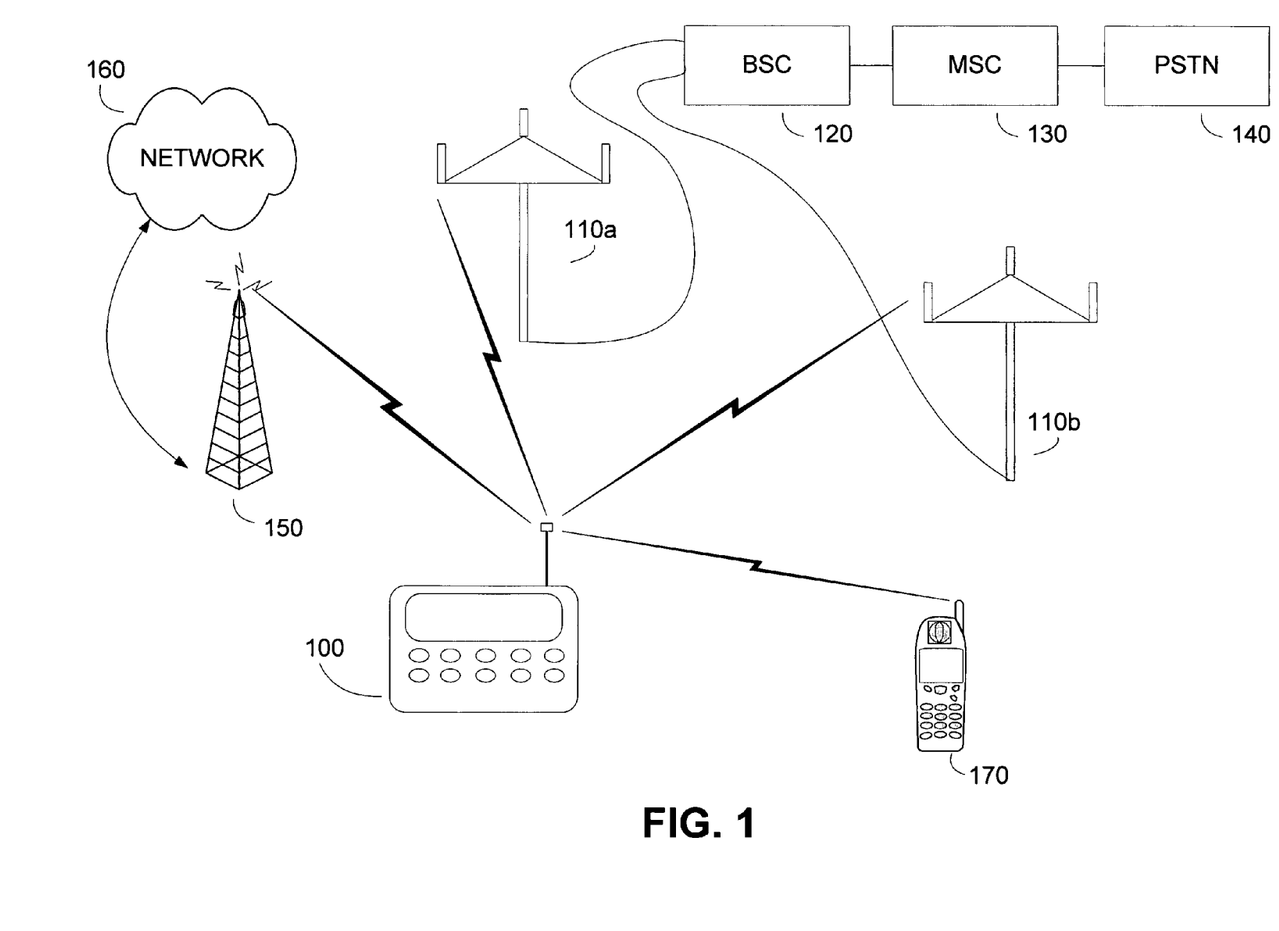
FIG. 1 is a simplified functional block diagram of an embodiment of a multi-mode radio in communication with multiple communication systems.

FIG. 1 is a simplified functional block diagram of an embodiment of a multi-mode communication device, configured according to the methods and apparatus disclosed herein, and concurrently operating in multiple communication systems, each having a corresponding communication standard. The multi-mode communication device can be referred to alternatively as a user terminal 100, mobile terminal, user device, portable device, mobile station, or some other device. Additionally, the user terminal 100 need not be a portable device but may instead be a stationary device.

In FIG. 1, the user device 100 is shown as communicating with three distinct terminals corresponding to three distinct communication systems. However, the disclosure is not limited to communications with three communication systems, but is applicable to any number of communication systems having any number of different communication protocols.

In the embodiment of FIG. 1, the user device 100 is configured to communicate with a first communication system, which may be a wireless telephone system such as a GSM telephone system, a second communication system, which may be a wireless local area network (WLAN) such as an IEEE 802.11 network, and a third communication system, which may be a Pico or Personal Area Network (PAN) such as a Bluetooth network. In the above example, each of the communication systems can be a time multiplex or packet data communication system and the user device 100 can be configured to concurrently communicate with the communication systems by time multiplexing a single RF section.

The user device 100 can be configured to communicate with a first communication system, which may be a GSM wireless telephone system. The user device 100 can communicate with one or more base stations 110*a* and 110*b*, which are coupled to one or more base station controllers 120. In the embodiment of FIG. 1, two base stations 110*a* and 110*b* are shown coupled to the same base station controller 120, although such a configuration is not a requirement. The base station controller 120 can be coupled to a mobile station controller 130 which in turn can be coupled to a public switched telephone network (PSTN) 140. The first communication system is a two way communication system and the user device 100 can be configured to both transmit and receive information to and from the system.

The user device 100 can be configured to concurrently communicate with a second communication system, which can be a WLAN system. The WLAN system can include one or more access points 150 coupled to a network 160. The network 160 can be any type of communication network, such as a LAN or the Internet. The user device 100 can be configured to communicate with the WLAN using a second communication protocol that is distinct from a first communication protocol used to communicate with the first communication system. For example, the second communication system may be an IEEE 802.11 WLAN and the user device 100 can be configured to communicate with the system according to the IEEE 802.11 standard.

The user device 100 can also be configured to concurrently communicate with a third communication system, which may be a PAN such as a Bluetooth network. The user device 100 can be configured to communicate directly with a Bluetooth enabled device 170. For example, the user device 100 can be configured to receive communications from other like configured devices using the Bluetooth communication protocol. Other Bluetooth enabled devices can include kiosks, personal digital assistants, or wireless headsets.

Figure 2:
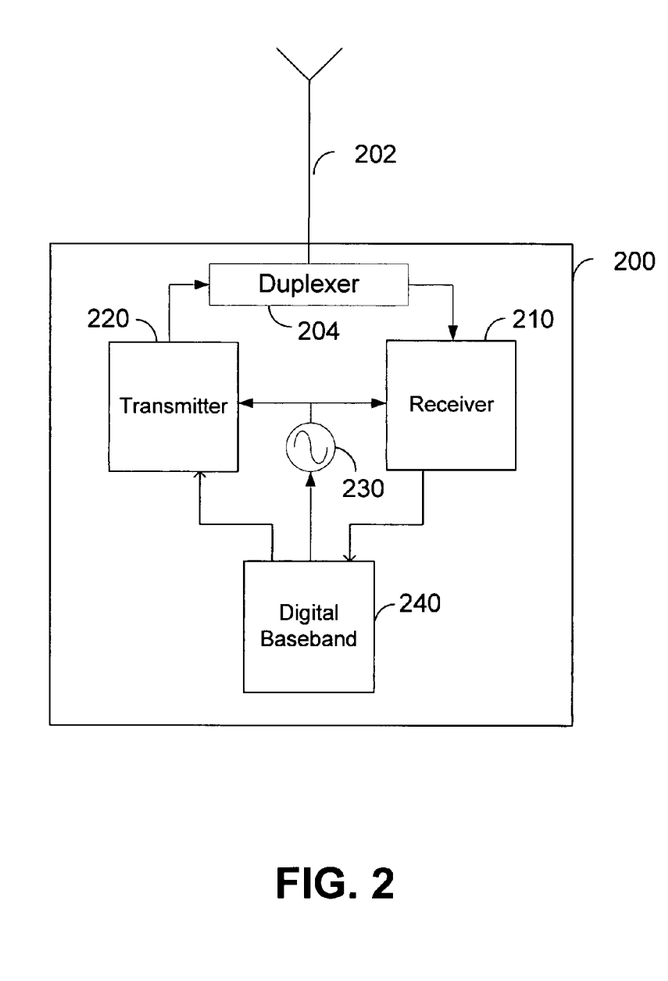
FIG. 2 is a simplified functional block diagram of an embodiment of a multi-mode wireless communication device.

FIG. 2 is a simplified functional block diagram of an embodiment of a multi-mode user terminal 100. The multi-mode user terminal 100 can be, for example, the user terminal shown in the embodiment of FIG. 1.

The multi-mode user terminal 100 can be configured for concurrent communications with a plurality of wireless communication systems. Unlike prior multi-mode user terminals that must complete an active communication with a communication system before communicating with another communication system, the multi-mode user terminal can concurrently communicate over multiple active communication sessions with multiple asynchronous communication systems by time multiplexing the configuration of the user terminal to each of the communication systems.

The user terminal 100 can include a multi-band antenna 202 coupled to a multi-mode transceiver 200. The multi-band antenna 202 can be configured to operate in all of the transmit and receive operating bands corresponding to the communication systems and standards supported by the user terminal 100. The multi-band antenna 202 can include a single antenna element that is capable of supporting all of the desired operating bands, or can include multiple antenna elements implemented as a single antenna, where each of the multiple antenna elements is configured to support one or more of the operating bands. The multi-band antenna 202 can include a single interface shared between the transmit and receive paths or can include distinct interfaces for the transmit and receive signal paths. Some antenna elements can be configured for transmit bands, while other antenna elements can be configured for receive bands. For example, the multiple antenna elements can be stacked along a single axis or can be coaxial, or can be a combination of stacked and coaxial.

The multi-band antenna 202 can be coupled to a duplexer 204 within the multi-mode transceiver 200. The duplexer 204 can be configured to couple received signals from the multi-band antenna 202 to the receive signal path and can be configured to couple the transmit signals from the transmit signal path to the multi-band antenna 202. The duplexer 204 can also provide signal isolation between the transmit and receive signal paths. The duplexer 204 is shown as coupled to a single receive signal path and a single transmit signal path. However, the receive and transmit single paths can represent multi-mode signal paths that may be separate and distinct parallel signal paths or some combination of common and parallel signal paths.

The receive output from the duplexer 204 can be coupled to a receiver 210 that can be a multi-mode receiver as described herein and shown in following embodiments. In another embodiment, the duplexer 204 can be omitted and the multi-band antenna 202 can be a multi-band antenna having distinct transmit and receive interfaces or a separate multi-band transmit antenna and a multi-band receive antenna can be used. In one embodiment, the receiver 210 can be a single integrated circuit (IC) that is configured to provide the frequency conversion and analog signal processing for all of the supported modes. In another embodiment, the receiver 210 can include multiple receive ICs, with each of the receive ICs configured to support a subset of all of the communication systems supported by the receiver 210. In other embodiments, the receiver 210 can include multiple ICs or discrete components with each of the ICs configured to support as few as a single receive mode supported by the receiver.

The receiver 210 can use a LO signal that is generated using an LO 230. A frequency conversion operation performed by the receiver 210 can use the LO signal, and the frequency of the receiver output can be based in part on the LO frequency. The output from the receiver 210 is typically a baseband signal, but can also be a low Intermediate Frequency (IF) near baseband or some other IF. A low IF can be any frequency in which a baseband processor can operate directly on the signal.

The receiver 210 can be an analog receiver having an analog output. Alternatively, the receiver 210 can include a analog to digital converter (ADC) and can provide a digital output. The output of the receiver 210 can be coupled to a digital baseband portion 240.

The digital baseband portion 240 can perform the majority of the signal processing on the received signal. If the receiver 210 is configured to provide an analog output signal, the digital baseband portion 240 can include an ADC that is configured to convert the receive baseband signal to a digital representation. The digital baseband portion 240 can process the received signals to recover the underlying information bits that can be used within the transceiver or output to a user or some other device (not shown).

The digital baseband portion 240 can also be configured to process transmit baseband signals that can be received from a user via a user interface (not shown), an external device (not shown) or a source internal to the transceiver 200. The digital baseband portion 240 can, for example, filter, encode, and modulate the transmit signals in a manner that is specified by a standard corresponding to the supported communication system. The transmit baseband signal output can be a baseband signal, a signal at a low IF near baseband, or a signal at some other IF. The transmit baseband output from the digital baseband portion 240 can be coupled to a transmitter 220.

The transmit output of the digital baseband portion 240 can be an analog signal or a digital signal. To provide an analog output signal, the digital baseband portion 240 can include a digital to analog converter (DAC).

The transmitter 220 can receive the transmit baseband output from the digital baseband portion 240 and can process the signal for transmission via the multi-band antenna 202. The transmitter 220 can be configured to, for example, filter, amplify, and frequency convert the baseband signal. The transmitter 220 can be a multi-mode transmitter as described in further detail below. The transmitter 220 can be implemented as a single multi-mode transmitter IC, multiple transmitter ICs, or multiple discrete and integrated circuits configured as a multi-mode transmitter.

The transmitter 220 can be configured to frequency convert the baseband signal to an RF signal based on the frequency of the LO 230. The transmitter 220 can be configured to perform direct conversion upconversion or can be configured to provide multiple frequency conversion stages.

The digital baseband portion 240 can be configured to control the operating modes of the receiver 210, transmitter 220, and LO 230. For example, the digital baseband portion 240 can program the LO frequency and configure the receiver 210 and transmitter 220 to support a particular communication standard. The digital baseband portion 240 can configure, for example, the gains and filter bandwidths of the receiver 210 and/or transmitter 220 based on a currently supported communication standard.

In one embodiment, the receiver 210, transmitter 220, LO 230 and digital baseband 240 can be separate components or they all can be integrated into a single component such as a VLSI IC. In other embodiments, some other combination of receiver 210, transmitter 220, LO 230 and digital baseband 240 integration is possible.

Figure 3:
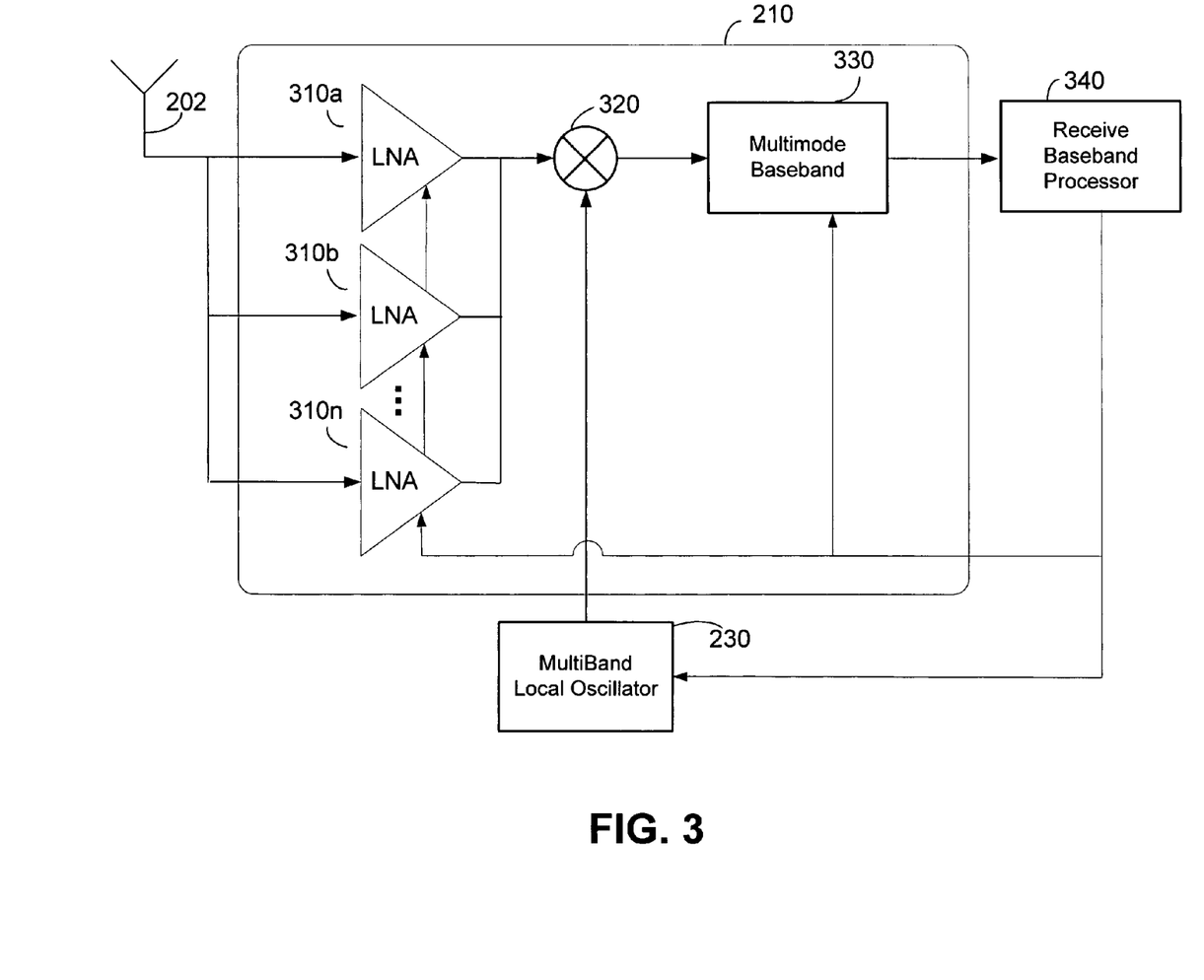
FIG. 3 is a simplified functional block diagram of an embodiment of a receiver in a multi-mode wireless communication device.

FIG. 3 is a simplified functional block diagram of an embodiment of a receive portion of a multi-mode user terminal, such as the user terminal of FIG. 2. As described earlier, the receive portion follows a receive signal path from a multi-band antenna 202, to a receiver 210 and a receive baseband processor 340 that can be a portion of a digital baseband portion. The duplexer of FIG. 2 can be included if the receive portion is implemented as part of a multi-mode transceiver, as in FIG. 2. Alternatively, the duplexer can be omitted if the user terminal omits the transmitter or has a separate antenna or antenna element for the transmitter.

Although the signals in the receive portion are shown and described as single-ended signals, the signals can be single-ended or differential. In one embodiment, the receiver 210 can implement both single-ended and differential signals, depending on the position of the signal in the receive signal path. Additionally, although processing of a single phase is described, the receive portion can be configured to support multi-phase signals, such as quadrature signals or some other M-ary signal format.

The receiver 210 can be a multi-mode receiver configured for single conversion processing of receive signals corresponding to multiple communication systems. The receive signal from the multi-band antenna 202 can be coupled to a plurality of LNAs 310a-310n coupled in parallel. In general, since each standard operates at a different receive frequency band, each receive chain includes a corresponding LNA. The number of LNAs 310a-310n can correspond to the number of supported communication systems, but are not required to correspond to the number of supported communication systems.

In one embodiment each LNA, for example 310a, supports a single communication system, and the number of LNAs 310a-310n coupled in parallel corresponds to the number of supported communication systems. In another embodiment some of the LNAs, for example 310b, can support more than one communication standard. An LNA 310b can support multiple communication standards, for example, where the receive operating bands of the multiple communication systems are sufficiently close to lie within the operating band of a single LNA. In another embodiment, multiple LNAs, for example 310a-310b, can be configured to support a single communication system. Such an implementation can be used where the communication system uses a wide receive frequency band or where the receive frequency band is noncontiguous. Therefore, in another embodiment, some LNAs 310a and 310b can be configured to support one communication system while another LNA 310n can be configured to support a plurality of communication systems.

The parallel LNAs 310a-310n can be configured to be activated as a single block or can be activated individually or in predefined groups. In one embodiment, each LNA, for example 310a, can be individually activated and may only be activated during the period of time that the receiver 210 is configured to support the communication over the receive frequency band supported by the LNA 310a. Control over the activation of the LNAs 310a-310n can be advantageous where the receiver 210 operates off of battery power or some other capacity limited power supply.

The output of the parallel LNAs 310a-310n can be coupled to a frequency downconversion stage, here shown as a mixer 320. The mixer 320 can be configured to multiply the incoming amplified receive signal by the local oscillator signal to frequency translate the incoming signal to a lower frequency at the mixer 320 output. The multi-band LO 230 can be set to all frequencies for standards implemented, and the multi-band LO 230 can be shared with the transmit portion described below. The multi-band LO 230 can be implemented external to transceiver as show in FIG. 3, or it can be integrated into the transceiver.

The receiver 210 can be configured as a direct conversion receiver that is configured to perform a single frequency conversion of the received signal. The output of the mixer 320 can be electrically coupled to a multi-mode receive baseband strip 330. The multi-mode baseband strip 330 can include a filter 332 and amplifier module 334 to filter and scale the downconverted receive signal.

The multi-mode baseband strip 330 can be configured to support any one of the communication systems supported by the receiver. In one embodiment, the receiver 210 can have a single receive signal output and can only be configured to support one standard at any one instant in time. Each standard can have its own signal bandwidth and blocking requirements which are processed in the multi-mode baseband strip 330. Thus, the multi-mode baseband strip 330 be configured for each standard.

For example, the filter 332 can be a programmable filter whose bandwidth can be programmed depending in part on which communication standard is presently supported. Similarly, the amplifier module 334 can be a programmable gain amplifier whose gain can be varied based in part on which communication standard is presently supported. Additionally, within each supported communication standard, the gain of the amplifier module 334 may be varied according to the operation of an automatic gain control (AGC) configuration that is implemented for the particular communication standard.

The output of the multi-mode baseband strip 330 can be coupled to an ADC 336 configured to digitize the signal so that it can be further processed by a receive baseband processor 340 that can be part of a digital baseband processor. The receive baseband processor 340 can perform any further processing of the received signal. The receive baseband processor 340 can also be configured to control the receiver 210 and configure the receiver 210 for the communication standard. By designing a multi-mode transceiver using a multi-band local oscillator and a multi-mode baseband, a smaller and less expensive product can be achieved because more electronic circuitry can be reused.

Figure 4:
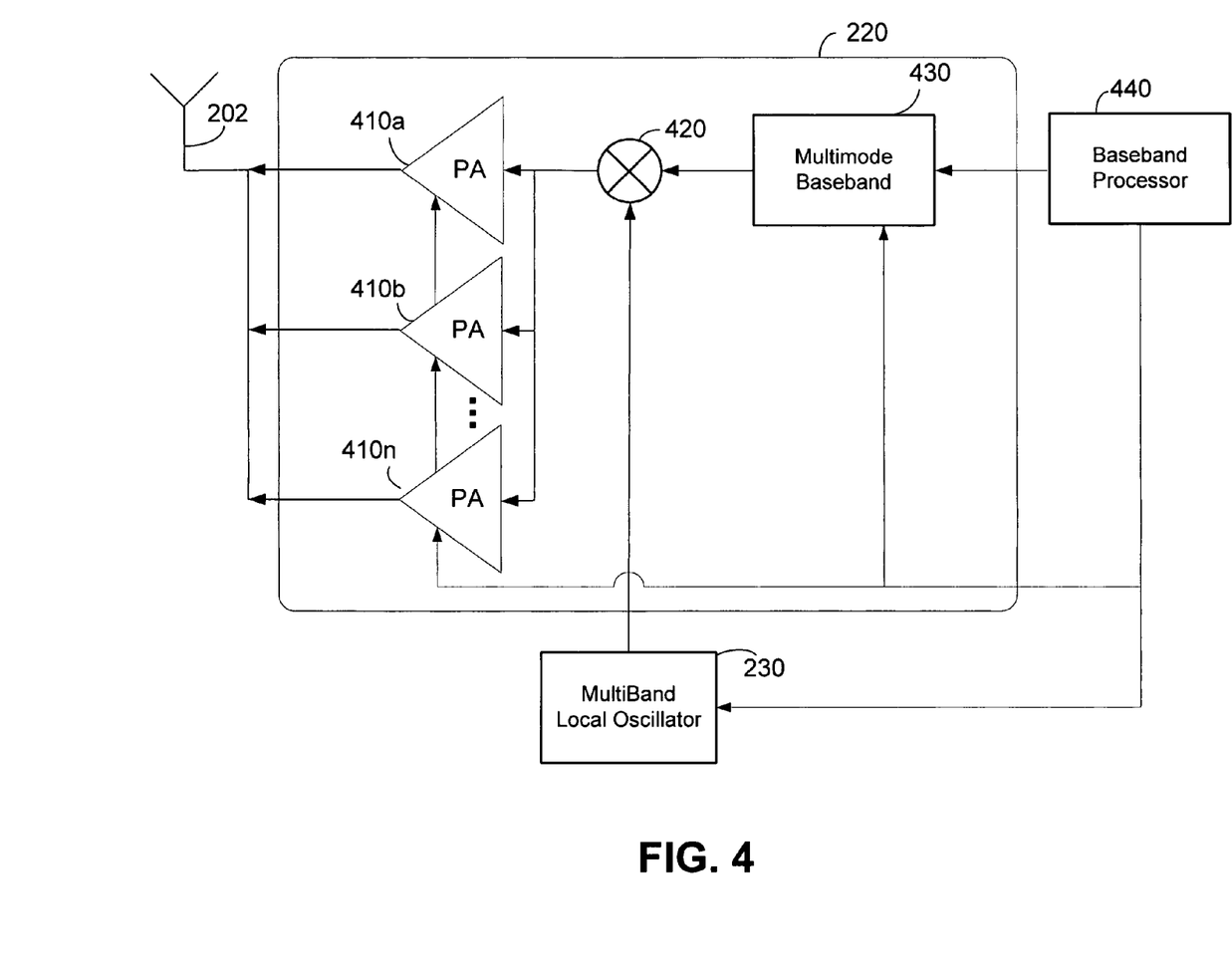
FIG. 4 is a simplified functional block diagram of an embodiment of a transmitter in a multi-mode wireless device.

FIG. 4 is a simplified functional block diagram of an embodiment of a transmit portion of a multi-mode user terminal, such as the user terminal of FIG. 2. The transmit portion can be configured to support the same number of communication standards as the receive portion, but may also be configured to support more or fewer communication standards. The transmit portion can include a transmit baseband processor 440 that can be a portion of a digital processor or digital baseband portion, such as the one shown in FIG. 2.

The output of the transmit baseband processor 440 can be coupled to a transmitter 220 that upconverts the baseband transmit signal to an RF signal in the appropriate operating band using the multi-band LO 230. The output of the transmitter 220 can be coupled to the multi-band antenna 202 for transmission to a destination device.

As was the case with the receive portion of FIG. 3, the signals in the transmit portion are shown and described as single-ended signals, but the signals can be single-ended or differential. In one embodiment, the transmitter 220 can implement both single-ended and differential signals, depending on the position of the signal in the transmit signal path. Additionally, although processing of a single phase is described, the transmit portion can be configured to support multi-phase signals, such as quadrature signals or some other M-ary signal format.

The transmit baseband processor 440 can be configured to control the operating mode of the transmitter 220 and multi-band LO 230. In embodiments where the multi-band LO 230 is shared with the receive portion, a controller in the digital baseband common to the transmit and receive baseband processors can be used to control the LO frequency.

The transmitter 220 can be configured to receive a digital baseband signal and can include a DAC 436 to convert the digital signal to an analog representation. The analog output of the DAC 436 can be coupled to a transmit multi-mode baseband strip 430 that can be configured to process the signals corresponding to each of the supported communication standards. The transmit multi-mode baseband strip 430 can include a programmable gain amplifier module 434 and a programmable filter 432 to amplify and filter the transmit baseband signal. The filter 432 bandwidth and amplifier module 434 gain can be programmed, for example, by a controller in the transmit baseband processor 440 and can vary depending on the presently supported communication standard.

The output of the transmit multi-mode baseband strip 430 can be coupled to a frequency upconverter, here shown as a mixer 420, that is configured to frequency convert the baseband transmit signal to an RF transmit signal. A direct conversion transmitter can be advantageous to minimize spurious products and the number of transmitter components.

The RF frequency of the signal at the output of the mixer 420 can be determined by the frequency of the baseband signal and the frequency of the multi-band LO 230. The output of the mixer 420 can be coupled to a plurality of power amplifiers 410a-410n coupled in parallel. The multi-band LO 230 can be implemented external to the transceiver as show in FIG. 4 or it can be integrated into the transceiver.

Similar to the conditions with the LNAs in the receiver, the power amplifiers 410a-410n can correspond to the number of supported communication systems, but are not required to correspond to the number of supported communication systems. In general, each standard operates at a different transmit frequency band, and each power amplifier, for example 410a, may only be able to support a single operating frequency band.

In one embodiment each power amplifier, for example 410a, supports a single communication system, and the number of power amplifiers 410a-410n coupled in parallel corresponds to the number of supported communication systems. In another embodiment some of the power amplifiers, for example 410b, can support more than one communication standard. In another embodiment, multiple power amplifiers, for example 410a-410b, can be configured to support a single communication system. Therefore, in another embodiment, some power amplifiers 410a and 410b can be configured to support one communication system while another power amplifier 410n can be configured to support a plurality of communication systems.

The parallel power amplifiers 410a-410n can be configured to be activated as a single block or can be activated individually or in predefined groups. In one embodiment, each power amplifier, for example 410a, can be individually activated and may only be activated during the period of time that the transmitter 220 is configured to use the power amplifier 410a. Control over the activation of the power amplifiers 410a-410n can be advantageous where the transmitter 220 operates off of battery power or some other capacity limited power supply.

The output of the power amplifiers 410a-410b can be coupled to the multi-band antenna 202. The coupling can be direct or can be indirect, such as when a duplexer is interposed between the power amplifiers 410a-410n and the multi-band antenna 202.

In one embodiment, the receiver 210 and transmitter 220 can be configured to support a single communication system at any particular time. Thus, in order to communicate with a particular communication standard. the baseband portion, transmitter, and receiver are programmed to support the system. Additionally. a single multi-mode LO can be used to support both the transmit and receive portions of the user terminal.

However, the user terminal may need to concurrently communicate over a plurality of communication systems, and the various communication systems may be asynchronous and have no ability to coordinate communications with the user terminal. In one embodiment, the user terminal can concurrently support communications with multiple communication systems by time slicing or otherwise time multiplexing the configuration of the user terminal, with each time slice corresponding to a time period in which the user terminal is configured for communications with a particular communication system.

Figure 5:
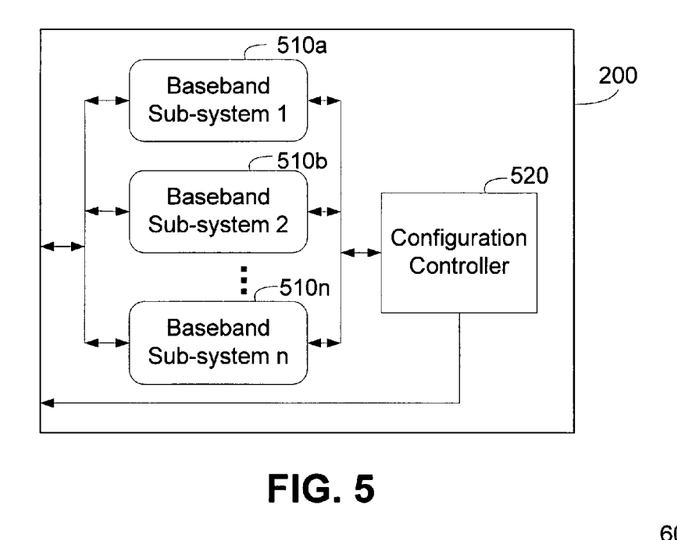
FIG. 5 is a simplified functional block diagram of an embodiment of a digital baseband portion.

FIG. 5 is a simplified functional block diagram of an embodiment of a digital baseband portion 240, such as the digital baseband portion shown in the user device of FIG. 2. The digital baseband portion 240 can include the receive baseband processor and the transmit baseband processor shown in FIGS. 3 and 4.

The digital baseband portion 240 multiple baseband sub-systems 510a-510n configured to support the multiple communication systems. In one embodiment, each baseband sub-system, for example 510a, can be configured to support one of the communication systems with which the user device can operate.

Each of the baseband sub-systems 510a-510n can be coupled to a common port. In one embodiment, the baseband sub-systems 510a-510n can transmit and receive across the same port. In another embodiment, the port can include separate receive and transmit ports.

Each of the baseband sub-systems 510a-510n can be coupled to a common configuration controller 520 that can be configured to generate the configuration signals and commands that can be coupled to a corresponding transceiver. For example, the configuration controller can issue commands that program the LO frequency, filter bandwidths, and amplifier gains of a transceiver based on an operating mode of the user terminal.

The configuration controller 520 can also allow the baseband sub-systems 510a-510n to determine the present operating state issued by the configuration controller 520. The baseband sub-systems 510a-510n can selectively inhibit communications based on the state issued by the configuration controller 520.

For example, the associated transceiver (not shown) can be configured with a single transmit or receive signal path. Thus, the transceiver may support only a single transmit or receive signal at any particular time. The baseband sub-system, for example 510a, corresponding to the present state can communicate using the transceiver. The other baseband sub-systems, 510b-510n can access the configuration controller 520 to determine the present operating state, and may inhibit communications based on the state. In one example, the second baseband sub-system 510b can determine that the operating state corresponds to the first baseband sub-system 510a, and thus, may reschedule or reattempt a transmission at a later time. By monitoring the operating state, the baseband sub-systems 510a-510n can minimize or eliminate collisions where multiple baseband sub-systems attempt to request that the configuration controller 520 simultaneously configure the transceiver for two distinct operating states.

Figure 6:
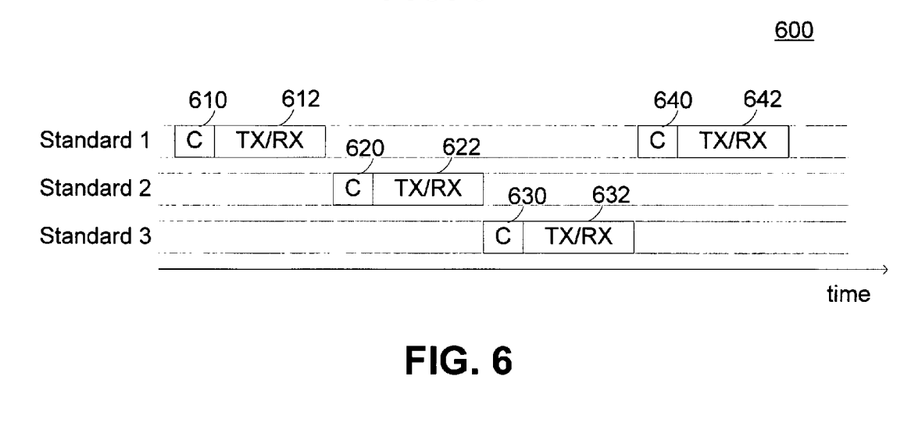
FIG. 6 is a simplified timing diagram of an embodiment of configuring a multi-mode wireless device to support multiple communication systems.

FIG. 6 is an example of a time diagram 600 for a user terminal configured to support concurrent communications with three separate communication systems. Standard 1 can correspond to a first communication system, such as a GSM telephone system. Standard 2 can correspond to a distinct communication system, such as a WLAN communication system, and Standard 3 can correspond to a third distinct communication system, such as a PAN communication system.

Using the disclosed time slicing or multiplexing technique, the user terminal can maintain concurrent communication with a plurality of communication systems. Thus, the user terminal configuration can be time multiplexed to concurrently support an active traffic channel over a GSM communication system, an active session with a WLAN access point, and an active Bluetooth communication link. In other multi-mode devices, either multiple radios and baseband processors are required, or the user terminal can support only one active communication system.

The baseband portion can initially configure the multi-mode transceiver to transmit and/or receive signals for a first standard during a first configuration period 610. The user terminal can then transmit and/or receive for a first predefined period of time 612. The baseband portion can configure the multi-mode transceiver during a second configuration period 620 to transmit and/or receive signals corresponding to a second standard. The user terminal can then transmit and/or receive for a second predetermined period of time 622 that can be the same or different duration relative to the first predefined period of time 612.

The baseband portion can configure the multi-mode transceiver during a third configuration period 630 to transmit and/or receive signals corresponding to a third distinct standard. The user terminal can then transmit and/or receive signals in the third communication system for a third predetermined period of time 632. To complete the cycle of configurations, the baseband portion can reconfigures the transceiver in a fourth configuration period 640 to transmit and/or receive signals for the first standard. The user terminal can then transmit and/or receive for a fourth predetermined period of time 642.

The configuration time periods 610, 620, 630, and 640 can be configured to be the same duration, because the transceiver can typically be tuned to any operating configuration in the same period of time. Of course, a single configuration time period is not a requirement.

In one embodiment, the user terminal can only be configured transmit or receive during any particular time period and thus the transceiver can initially be configured to transmit to the communication system and later be configured to receive from the communication system. Thus, the user terminal can be configured to transmit using Standard 1 during the first period 612 and receive using Standard 1 during the fourth period 642.

The baseband portion can be configured to time multiplex all of the supported communication standards or only a subset of the communication standards, based on a user input or a system input. For example, in one embodiment the user terminal can be configured to allow support for particular communication systems to be selectively activated or deactivated, and may not assign any time slices to deactivated communication systems.

The baseband portion can assign time slices according to a predetermined schedule. The predetermined schedule can be a round-robin schedule or can favor one or more communication systems over another. Thus, the user terminal can be configured to support a first communication standard more frequently than a second communication standard. In other embodiments, the scheduling of communication standards can follow a random or pseudorandom sequence.

During the configuration period, the terminal may tune an LO frequency, tune a filter center frequency, and tune a filter bandwidth. During the period in which the user terminal configures the transceiver, the user terminal may also configure the digital baseband for the corresponding communication system. Typically, the amount of time required for an LO to tune and settle to a desired frequency is much greater than the time to configure any of the other elements of the user terminal. Additionally, in some embodiments one or more baseband sub-systems may be configured to simultaneously and independently support multiple communication systems. Thus, the time to tune the radio may be the constraining factor in determining how quickly the user terminal can configure itself for different communication systems. Advantageously, the configuration periods 610, 620, 630, and 640 can have a duration that exceeds a maximum configuration duration corresponding to the maximum time required for the user terminal to change the configuration from one standard to another. In one embodiment, the maximum duration can be on the order of 160 μs. For example, the configuration period can be defined to be no greater than 400 μs, 300 μs, 250 μs, 200 μs, 160 μs, 150 μs, 100 μs, or some other predetermined time period.

Further, the time period between successive transmissions in the first communication system may be a defined period of time, such as in a time multiplexing system like a GSM telephone system. Thus the user terminal supporting a GSM system as the first communication system has a fixed, predictable time between the first transmit or receive predefined period of time 612 and a subsequent transmit or receive predefined period of time 642.

For example, the GSM communication system uses a combination of Time and Frequency-Division Multiple Access (TDMA/FDMA). The FDMA part involves the division by frequency of the bandwidth into carrier frequencies spaced 200 kHz apart. One or more carrier frequencies are assigned to each base station. Each of these carrier frequencies is then divided in time, using a TDMA scheme. The fundamental unit of time in this TDMA scheme is called a burst period and it lasts 15/26 ms, or approx. 0.577 ms. Eight burst periods are grouped into a TDMA frame of 120/26 ms, or approx. 4.615 ms, which forms the basic unit for the definition of logical channels. One physical channel is one burst period per TDMA frame. Thus, the predefined period of time 612 to support GSM communications can be about 577 μs.

The GSM system defines traffic channels (TCH) to carry speech and data traffic. Traffic channels are defined using a 26-frame multiframe, or a group of 26 TDMA frames. The length of a 26-frame multiframe is 120 ms, which defines the length of a burst period. The burst period is thus 120 ms divided by 26 frames divided by 8 burst periods per frame. Out of the 26 frames, 24 are used for traffic, 1 is used for the Slow Associated Control Channel (SACCH) and 1 is currently unused. TCHs for the uplink and downlink are separated in time by three burst periods, so that the user terminal does not have to transmit and receive simultaneously, thus simplifying the electronics, specifically increasing the time allowed for changing LO frequencies allowing slower settling Phase Lock Loops (PLLs). As the propagation delay between the BTS and user terminal increases, the BTS instructs the user terminal to transmit earlier so that it is synchronized to other transmitting units. Thus, the three burst period between uplink and downlink is shortened by a timing advance interval.

Communications over a WLAN communication system, such as an IEEE 802.11 communication system can have a transmission period that is defined, in part, based on the size of the data packet to be transmitted. Thus, the predefined period of time 622 to support WLAN communications can be variable. However, the predefined period of time 622 to support WLAN communications can be limited when concurrent communications with multiple communication systems is enabled. The predefined period of time 622 can be limited, for example, based on the timing requirements of one or more of the other communication systems. Thus, in one embodiment, the predefined period of time 622 for a WLAN system can be limited by a time duration defined between successive activations of a GSM communication system.

Similarly, in a Bluetooth system the channel is divided into time slots of 625 μs in length. In the time slots a master and slave can transmit packets. Therefore, the predefined period of time 632 to support Bluetooth communications can be approximately 312 μs.

Figure 7:
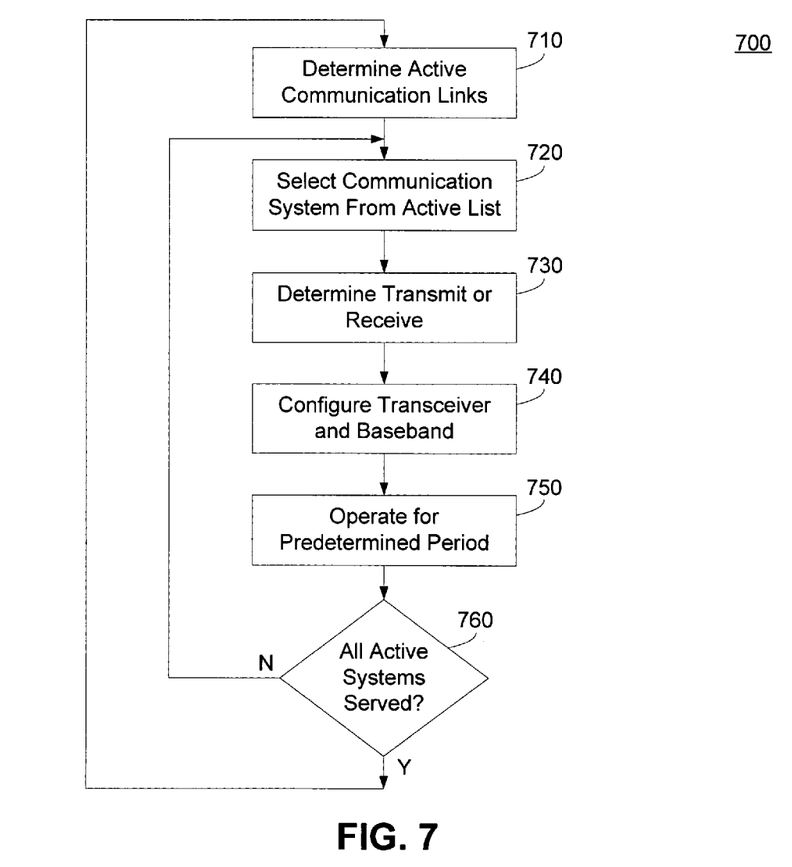
FIG. 7 is a simplified flowchart of an embodiment of a method of supporting multiple modes in a wireless communication device.

FIG. 7 is a flowchart of an embodiment of a method 700 of configuring a multi-mode wireless device for concurrent communications with a plurality of communication systems. The method 700 can be implemented, for example, by the digital baseband portion of FIG. 5 or the digital baseband of the user terminal shown in FIG. 2.

The method 700 begins at block 710 where the digital baseband determines the active communication links corresponding to active communication systems. In one embodiment, the number of active communication links can be fewer than the number of communication systems that are supported by the digital baseband. The user terminal may allow a user to disable one or more communication systems. Alternatively, the digital baseband may temporarily disable one or more communication systems, for example, based on a state of the digital baseband or on multiple unsuccessful communication attempts. The digital baseband can keep a list of active communication links.

The digital baseband proceeds to block 720 and selects a communication system from the list of active communication links. The digital baseband can be configured to select the communication system based on a predetermined sequence. The digital baseband can, for example select each active communication system in the order of the list, or may select the communication system based on a hierarchy, or a random or pseudorandom sequence.

After selecting the communication system, the digital baseband can determine whether the user device is to be configured for transmit or receive. The state may be determined based on external stimulus, such as a scheduled transmit or receive period, or can be determined based on internal stimulus, such as having information to transmit within a particular communication system.

After determining whether to transmit or receive, the digital baseband proceeds to block 740 and configures the transceiver for the selected operating state. The digital baseband may also configure a baseband sub-system based on the operating state. The digital baseband can, for example, configure an LO frequency, a filter bandwidth, an amplifier gain, and can activate the appropriate LNA or power amplifier, while deactivating others not supporting the operating state.

After configuring the elements of the user terminal, the digital baseband proceeds to block 750 and operates in the state for a predetermined period of time. The predetermined period can be determined, for example, based on the operating state or based on the amount of information to be transmitted or received.

After the expiration of the predetermined operating period of time, the digital baseband proceeds to decision block 760 and determines if all communication systems in the active communication system list have been served at least once. If not, the digital baseband proceeds back to block 720 and selects a communication system for the present active communication system list.

If, at decision block 760, the digital baseband determines that all of the communication systems in the list of active communication systems have been served at least once, the digital baseband can return to block 710 to update the list of active communication systems.

An architecture for a multi-mode communication device has been described herein. The multi-mode communication device can include a multi-mode transceiver coupled to a multi-mode baseband portion, that can be a digital baseband portion.

The multi-mode transceiver can include a multi-mode transmitter and a multi-mode receiver operating with a shared LO. The multi-mode transmitter can include a common analog baseband transmit signal path coupled to an upconverter that couples the RF transmit signal to a plurality of power amplifiers configured in parallel. Each power amplifier can be configured to support at least one distinct operating band or communication system not supported by any other power amplifier.

Similarly, the multi-mode receiver can include a plurality of LNAs coupled n parallel, with each LNA configured to amplify received signals from at least one distinct operating band or communication system not supported by any other LNA. The outputs from the plurality of LNAs can be coupled to a single frequency downconverter that downconverts the received signals to baseband. The downconverted baseband signals can be processed in an analog receive baseband strip that can be configured to support a single receive operating mode.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A multi-mode wireless communication device capable of concurrent wireless communications with a plurality of wireless communication systems, the device comprising:
 a multi-mode transceiver having a single transmit signal path and a single receive signal path; and
 a multi-mode baseband portion configured to configure an operating mode of the multi-mode transceiver in a time multiplex manner to each of the plurality of wireless communication systems to permit the concurrent wireless communications with the plurality of wireless communication systems, wherein the multi-mode transceiver comprises:
 a local oscillator (LO) having a programmable frequency that can be tuned to frequencies spanning at least transmit and receive operating bands corresponding to the plurality of wireless communication systems;
 a transmitter configured to receive a baseband transmit signal from the multi-mode baseband portion and frequency convert the baseband transmit signal, using the LO, to an RF transmit frequency in any one of the transmit operating bands of the plurality of wireless communication systems; and
 a receiver configured to receive RF signals from any one of the receive operating bands and frequency convert the RF signals, using the LO, to a baseband receive signal.

2. The device of claim 1, wherein the multi-mode transceiver comprises:
 a configurable multi-mode transceiver integrated circuit having the transmitter and receiver,
 wherein the transmitter comprises a multi-mode direct conversion transmitter, and
 wherein the receiver comprises a multi-mode direct conversion receiver.

3. The device of claim 1, wherein the transmitter comprises a plurality of power amplifiers in parallel, each power amplifier configured to amplify signals in at least one distinct transmit band of the plurality of wireless communication systems, and wherein each of the plurality of power amplifiers can be selectably deactivated based on the operating mode of the multi-mode transceiver.

4. The device of claim 1, wherein the transmitter comprises:
 a frequency upconverter coupled to the multi-mode baseband portion and configured to frequency convert a transmit baseband signal to the RF transmit signal based on the programmable frequency of the LO; and
 a plurality of power amplifiers in parallel with inputs coupled to the frequency upconverter, each power amplifier configured to amplify signals in at least one transmit band of one of the plurality of wireless communication systems.

5. The device of claim 1, wherein the transmitter comprises:
 a transmit baseband strip having a filter with a programmable filter bandwidth configured to filter the baseband transmit signal from the multi-mode baseband portion;
 a frequency upconverter coupled to the transmit baseband strip and configured to frequency convert the transmit signal to the RF transmit signal; and
 a plurality of power amplifiers in parallel with inputs coupled to the frequency upconverter, each power amplifier configured to amplify signals in at least one distinct transmit band of one of the plurality of wireless communication systems.

6. The device of claim 5, wherein the transmit baseband strip, the frequency upconverter, and the plurality of power amplifiers are implemented on a single integrated circuit.

7. The device of claim 5, wherein the bandwidth of the filter is based in part on the operating mode of the multi-mode transceiver.

8. The device of claim 5, further comprising a programmable amplifier module in the transmit baseband strip having a gain based in part on the operating mode of the multi-mode transceiver.

9. The device of claim 1, wherein the receiver comprises:
a plurality of Low Noise Amplifiers (LNAs) in parallel, each configured to amplify signals in at least one distinct receive band of the plurality of wireless communication systems, and wherein each of the plurality of LNAs can be selectably deactivated based on the operating mode of the multi-mode transceiver.

10. The device of claim 9, wherein the receiver further comprises a frequency downconverter coupled to the plurality of LNAs and the LO, and configured to frequency convert the RF signals from any one of the receive operating bands to a baseband receive signal.

11. The device of claim 1, wherein the multi-mode baseband portion configures the operating mode of the multi-mode transceiver in part, by configuring a mutually exclusive transmit or receive mode of the multi-mode transceiver, and a local oscillator frequency.

12. The device of claim 1, wherein the multi-mode baseband portion configures the operating mode of the multi-mode transceiver based in part on a predetermined time multiplex sequence.

13. The device of claim 1, wherein the multi-mode baseband portion configures the operating mode of the multi-mode transceiver based in part on a list of active communication systems.

14. A multi-mode wireless communication device capable of concurrent wireless communications with a plurality of wireless communication systems, the device comprising:
a multi-mode transceiver integrated circuit including a transmitter having a plurality of power amplifiers in parallel, each power amplifier configured to amplify signals in at least one distinct transmit band of one of the plurality of wireless communication systems, and a receiver having a plurality of Low Noise Amplifiers (LNAs) in parallel, each LNA configured to amplify signals in at least one distinct receive band of the plurality of wireless communication systems; and
a multi-mode baseband portion configured to configure an operating mode of the multi-mode transceiver in a time multiplex manner to each of the plurality of wireless communication systems to-permit the concurrent wireless communications with the plurality of wireless communication systems,
wherein the multi-mode baseband portion configures the operating mode of the multi-mode transceiver in part, by configuring a mutually exclusive transmit or receive mode of the multi-mode transceiver, and a local oscillator frequency.

15. The device of claim 14, wherein the multi-mode baseband portion configures the operating mode of the multi-mode transceiver based in part on a predetermined time multiplex sequence.

16. The device of claim 14, wherein the multi-mode baseband portion configures the operating mode of the multi-mode transceiver based in part on a list of active communication systems.

17. The device of claim 14, wherein the transmitter comprises a transmit baseband strip having a filter with a programmable filter bandwidth configured to filter a baseband transmit signal.

18. The device, of claim 14, comprising a programmable amplifier module in a transmit baseband strip having a gain based in part on the operating mode of the multi-mode transceiver.

19. A method of configuring a multi-mode wireless communication device, the method comprising:
selecting a communication system from a plurality of supported wireless communication systems for which active communications are time division multiplexed;
determining an operating mode for the selected wireless communication system from a predetermined time division multiplexing schedule based on a timing of a first of the plurality of supported wireless communication systems;
configuring a multi-mode transceiver based in part on the operating mode by selectively deactivating at least one Low Noise Amplifier (LNA) from a plurality of LNAs in parallel, each LNA configured to amplify signals in at least one distinct receive band of the plurality of supported wireless communication systems; and
operating in the operating mode for a predetermined period of time based on the predetermined time division multiplexing schedule.

20. The method of claim 19, wherein determining the operating mode comprises determining a transmit or a receive operating mode.

21. The method of claim 19, wherein configuring the multi-mode transceiver comprises selectively deactivating at least one of a plurality of power amplifiers in parallel, each power amplifier configured to amplify signals in at least one distinct transmit band of the plurality of supported wireless communication systems.

22. A method of configuring a multi-mode wireless communication device, the method comprising time multiplexing an operating mode of a multi-mode wireless transceiver, wherein time multiplexing the operating mode comprises:
configuring the multi-mode wireless transceiver for one of a plurality of operating modes from a predetermined time division multiplexing schedule based on a timing of a first of the plurality operating modes;
selectively deactivating, for a predetermined duration that is based on the predetermined time division multiplexing schedule, at least one Low Noise Amplifier (LNA) from a plurality of LNAs in parallel within the multi-mode wireless transceiver, each LNA configured to amplify signals in at least one distinct receive band of a plurality of wireless communication systems; and
selectively deactivating at least one of a plurality of power amplifiers in parallel within the multi-mode wireless transceiver, each power amplifier configured to amplify signals in at least one distinct transmit band of the plurality of wireless communication systems.

23. The method of claim 22, further comprising determining active communication links within the plurality of supported wireless communication systems, and wherein selecting the communication system comprises selecting a communication system corresponding to one of the active communication links.

24. The method of claim 22, wherein determining the operating mode comprises, determining a transmit or a receive operating mode.

25. The method of claim 22, wherein configuring the multi-mode wireless transceiver comprises configuring a filter with a programmable filter bandwidth to filter a baseband transmit signal based on the one of the plurality of operating modes.

26. A method of configuring a multi-mode wireless communication device, the method comprising:

selecting a communication system from a plurality of supported wireless communication systems from a predetermined time division multiplexing schedule based on a timing of a first of the plurality communication systems;

determining an operating mode for the selected wireless communication system;

configuring a multi-mode transceiver based in part on the operating mode by selectively deactivating at least one of a plurality of power amplifiers in parallel, each power amplifier configured to amplify signals in at least one distinct transmit band of the plurality of supported wireless communication systems; and operating in the operating mode for a predetermined period of time.

27. The method of claim 26, further comprising determining active, communication links within the plurality of supported wireless communication systems, and wherein selecting the communication system comprises selecting a communication system corresponding to one of the active communication links.

28. The method of claim 26, wherein determining the operating mode comprises determining a transmit or a receive operating mode.

* * * * *